(12) United States Patent
Fukumoto

(10) Patent No.: US 7,099,168 B2
(45) Date of Patent: *Aug. 29, 2006

(54) DC-AC CONVERTER AND CONTROLLER IC THEREFOR

(75) Inventor: Kenichi Fukumoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/203,030

(22) Filed: Aug. 12, 2005

(65) Prior Publication Data

US 2005/0269998 A1    Dec. 8, 2005

Related U.S. Application Data

(62) Division of application No. 10/501,795, filed on Jul. 16, 2004.

(60) Provisional application No. PCT/JP03/11032, filed on Aug. 29, 2003, now Pat. No. 6,982,889.

(30) Foreign Application Priority Data

Nov. 29, 2002   (JP) ............................. 2002-346855

(51) Int. Cl.
H02M 5/42 (2006.01)
H02M 3/335 (2006.01)
H02M 7/122 (2006.01)
H02M 7/5387 (2006.01)
H02J 1/00 (2006.01)

(52) U.S. Cl. ...................... 363/98; 363/17; 363/56.02; 363/132

(58) Field of Classification Search ................. 363/16, 363/17, 21.01, 21.05, 21.09, 21.1, 21.13, 363/21.17, 21.18, 56.01–56.04, 97, 98, 131, 363/132

See application file for complete search history.

(56) References Cited

U.S. PATENT DOCUMENTS

| 5,270,823 | A |   | 12/1993 | Heidebroek et al. ........ 348/730 |
|---|---|---|---|---|
| 5,875,103 | A | * | 2/1999 | Bhagwat et al. .............. 363/17 |
| 5,946,200 | A | * | 8/1999 | Kim et al. ..................... 363/17 |
| 6,038,142 | A | * | 3/2000 | Fraidlin et al. ............... 363/17 |
| 6,208,538 | B1 |  | 3/2001 | Halamik et al. .............. 363/41 |
| 6,259,615 | B1 |  | 7/2001 | Lin |
| 6,356,462 | B1 | * | 3/2002 | Jang et al. .................... 363/17 |

(Continued)

FOREIGN PATENT DOCUMENTS

JP             6-5393         1/1994

(Continued)

OTHER PUBLICATIONS

"Pulse-Width-Modulation Control Circuits", Texas Instruments, May 2002.

(Continued)

Primary Examiner—Matthew V. Nguyen
(74) Attorney, Agent, or Firm—Hogan & Hartson LLP

(57) ABSTRACT

A semiconductor switch circuit is connected to a primary winding of a transformer having a secondary winding connected to a load. The semiconductor switch circuit has switches controlled by PWM to provide a controlled constant current. In the inventive inverter, constant current control is performed by PWM operation of the switches of the semiconductor switch circuit. The inverter cuts off electricity to the control circuit when putting the control circuit into a standby state if a run-stop signal gains a logical stop-state. At the same time as the run-stop signal gaining the stop-state, switch drive signals enabling the switches of the semiconductor switch circuit are turned off. Thus, overcurrent can be prevented from flowing in the load when the control circuit is put into the standby state.

10 Claims, 5 Drawing Sheets

U.S. PATENT DOCUMENTS

| | | |
|---|---|---|
| 6,396,722 B1 | 5/2002 | Lin |
| 6,549,429 B1 | 4/2003 | Konno .................... 363/21.04 |
| 6,804,129 B1* | 10/2004 | Lin ............................ 363/98 |
| 6,809,938 B1* | 10/2004 | Lin et al. ...................... 363/17 |
| 6,816,395 B1 | 11/2004 | Kobori et al. ................ 363/97 |
| 6,927,989 B1* | 8/2005 | Fukumoto ................... 363/95 |
| 6,930,898 B1 | 8/2005 | Jeon et al. .................... 363/98 |
| 6,982,886 B1* | 1/2006 | Fukumoto ................... 363/72 |
| 6,982,889 B1* | 1/2006 | Fukumoto ................... 363/98 |
| 6,992,902 B1* | 1/2006 | Jang et al. ................... 363/17 |
| 2004/0240234 A1* | 12/2004 | Toda et al. .................. 363/22 |
| 2005/0007794 A1* | 1/2005 | Fukumoto ................... 363/16 |
| 2005/0047176 A1* | 3/2005 | Fukumoto ................... 363/17 |
| 2005/0219863 A1* | 10/2005 | Fukumoto et al. ............ 363/16 |

FOREIGN PATENT DOCUMENTS

| | | |
|---|---|---|
| JP | 11-4150 | 1/1999 |
| TW | 478240 | 3/2002 |

OTHER PUBLICATIONS

"BiCMOS Advanced Phase Shift PWM Controller", Texas Instruments, Jan. 2001.

"High Power Factor Preregulator", Texas Instruments, 1999.

* cited by examiner

DC-AC CONVERTER AND CONTROLLER IC THEREFOR

This is a divisional of application Ser. No. 10/501,795 filed Jul. 16, 2004, now U.S. Pat. No. 6,982,889, which is a 371 of PCT/JP03/11032, filed Aug. 29, 2003, which application is hereby incorporated by reference in its entirety.

FIELD OF THE INVENTION

The invention relates to a dc-ac converter (hereinafter referred to as inverter) for converting the dc voltage of such dc power supply as a power supply adapter and a battery of an electric apparatus into an ac voltage for driving a load. The invention also relates to a controller IC for use with such inverter.

BACKGROUND OF THE INVENTION

A cold cathode fluorescent light (CCFL) has been increasingly used as a backlight source of a liquid crystal display (LCD) monitor of a notebook PC and of an LCD for use with a TV set. Such CCFL has substantially the same high efficiency and long life as a usual hot cathode fluorescent light, without using a filament implemented in the hot cathode fluorescent light.

The CCFL requires a high startup voltage and a high operating voltage. For example, a startup voltage of about 1000 V and an operating voltage of about 600 V are required. These high ac voltages are generated from a dc power supply of, for example, a notebook PC and a liquid crystal TV set, using an inverter.

Conventionally, a Royer circuit has been used as an inverter for the CCFL. The Royer circuit comprises a saturable magnetic core transformer and a control transistor, and is adapted to undergo a self-sustaining oscillation because of nonlinear permeability of the saturable magnetic core and nonlinear current gain characteristic of the control transistor. The Royer circuit itself requires no external clock or driver circuit.

However, a Royer circuit is basically a constant voltage inverter, which cannot provide a constant output voltage if the input voltage thereto and/or the load current thereof varies. Hence, in order to maintain a constant input voltage to the Royer circuit, a regulator for supplying electric power to the Royer circuit is required. For this reason, besides the inverter utilizing a Royer circuit has low power inversion efficiency, it is difficult to miniaturize such inverter.

A CCFL inverter having improved power conversion efficiency has been disclosed (see for example Japanese Patent Early Publication H10-50489). This inverter comprises a first semiconductor switch connected in series with the primary winding of a transformer, a second semiconductor switch and a capacitor which are connected in series with each other and in parallel with the primary winding, and a coupling capacitor is connected in series with the secondary winding of the transformer and with the load. The primary current of the transformer is fed back to a control circuit for comparison with a reference voltage to establish a control signal, which signal is used to control on-off operation of a first and a second semiconductor switches to provide a predetermined ac power to the load.

A full bridge type CCFL inverter (also called H bridge type inverter) utilizing four semiconductor switches has been also proposed (see for example U.S. Pat. No. 6,259,615). This inverter utilizes a transformer having a primary winding connected to the output terminal of the H bridge via a resonant capacitor connected in series with the primary winding. The load is connected to the secondary winding of the transformer. Of the four semiconductor switches constituting the H bridge, a first set of two semiconductor switches establishes a current path in a first direction to the primary winding of the transformer and a second set of two semiconductor switches establishes a current path in a second direction to the primary winding. By feeding the secondary current back to a control circuit for comparison of the voltage indicative of the current with a reference voltage, a control signal having a fixed pulse-width and controlled relative pulse position is generated. The control signal is provided to the semiconductor switches of the H bridge to thereby regulate the power supplied to the load. Further, the voltage across the secondary winding of the transformer is detected to secure over-voltage protection.

In conventional inverters, when the CCFL is temporarily stopped, electricity to the control circuit is generally cut off by a run-stop signal, putting the control circuit into a standby state.

In the standby state, drive signals to the semiconductor switches of the inverter are stopped as the power to the control circuit is cut off. However, the gates of the semiconductor switches receiving the drive signals have capacitances, that prevent the semiconductor switches from being turned off instantly if the drive signals were stopped, thereby causing the current to continue to flow for a while. This current continues to flow until the electric charge on the capacitive gate of each semiconductor switch is completely discharged through a pull-down (or pull-up) resistor. Consequently, the magnitude of the resultant current can be a few times as large as the normal load current.

This excessively large load current flows through the CCFL every time the CCFL is stopped, imposing a strong stress on the CCFL and shortening the life of the CCFL.

It is, therefore, an object of the invention to provide an inverter having a semiconductor switch circuit in the primary winding of a transformer, the inverter capable of performing constant current control of a load through pulse-width modulation (PWM) control of the switches of the semiconductor switch circuit and of preventing over-current from flowing in the load when the inverter is put into a standby state. It is a still another object of the invention to provide a controller IC for use with such inverter.

SUMMARY OF THE INVENTION

An inverter in accordance with the invention comprises:
a dc power supply;
a transformer having a primary winding and at least one secondary winding;
a semiconductor switch circuit for allowing a current to flow alternately in a first direction and in a second direction from said dc power supply to said primary winding;
a load connected to said secondary winding;
a current detection circuit for detecting the magnitude of the current that flows through said load to generate a current detection signal;
a triangular wave signal generation circuit for generating a triangular wave signal;
a PWM control signal generation circuit, receiving said triangular wave signal and said current detection signal, for generating a PWM control signal by comparing said triangular wave signal with an error signal that is formed based on said current detection signal; and
a switch driving circuit receiving said PWM control signal and a run-stop signal, said switch driving circuit adapted to provide said semiconductor switch circuit with switch drive signals in accord with said PWM control signal when said run-stop signal has a logical run-state but provide said semiconductor switch circuit with switch drive signals instructing not to flow current to said primary winding when said run-stop signal has a logical stop-state (instructing standby), wherein, when said run-stop signal gains the stop-state, the power from said power supply to said PWM control signal generating circuit and switch driving circuit is cut off; and said switch driving circuit controls at least one of the switch drive signals enabling the switches of said semiconductor switch circuit so as to turn off said one switch.

A controller IC for controlling ac power supplied to a load by driving a semiconductor switch circuit in accordance with the invention comprises:

a triangular wave signal generation block, connected to an external capacitor and an external resistor for establishing oscillation, for generating a triangular wave signal;

a PWM control signal generation circuit, receiving said triangular wave signal and a current detection signal indicative of the magnitude of detected current flowing through said load, for generating a PWM control signal by comparing said triangular wave signal with an error signal that is formed based on said current detection signal; and a switch driving circuit receiving said PWM control signal and a run-stop signal, said switch driving circuit adapted to provide said semiconductor switch circuit with switch drive signals in accord with said PWM control signal when said run-stop signal has a logical run-state but provide said semiconductor switch circuit with switch drive signals instructing not to flow current to said primary winding when said run-stop signal has a logical stop-state, wherein, when said run-stop signal gains the stop-state, the power from said power supply to said PWM control signal generating circuit and switch driving circuit is cut off; and said switch driving circuit controls at least one of the switch drive signals enabling the switches of said semiconductor switch circuit so as to turn off said one switch.

The switches of the semiconductor switch circuit may be MOS field effect transistors (MOSFETs).

The switch driving circuit has a logic circuit receiving said PWM control signal and run-stop signal, said switch driving circuit adapted to form said switch drive signals based on the output of said logic circuit.

The switch driving circuit may have:

a logic circuit receiving said PWM control signal and run-stop signal;

a logic block for generating switch drive signals in accordance with a predetermined logic based on said PWM control signal that has passed through said logic circuit and a clock synchronized with said triangular wave signal; and an output block for outputting gate drive signals by amplifying said switch drive signal.

The output block may be:

adapted to amplify and invert said inputted switch drive signals before outputting said signals as gate drive signals;

provided at the output end thereof with a pulling resistor for pulling the level of said gate drive signals to predetermined potential; and adapted to render said pulling resistor short-circuited when said run-stop signal gains the stop-state.

The load can be a cold cathode fluorescent light (CCFL).

In the inventive inverter, and in the inventive controller IC therefor as well, adapted to perform constant current control of a load through PWM control of the respective switches of a semiconductor switch circuit and adapted to cut off power to the control circuit of the inverter in response to a run-stop signal that puts control circuit into a standby state, overcurrent is prevented from flowing through the load.

In the invention, the switch driving circuit can be simplified in structure by forming the switch drive signals in accordance with the output of the logic circuit receiving the PWM control signal and run-stop signal.

BEST MODE FOR CARRYING OUT THE INVENTION

Referring to the accompanying drawings, an inverter and a controller IC therefor in accordance with one embodiment of the invention will now be described in detail. The inverter shown herein generates from a dc power supply an ac voltage for driving a load.

Figure 1:
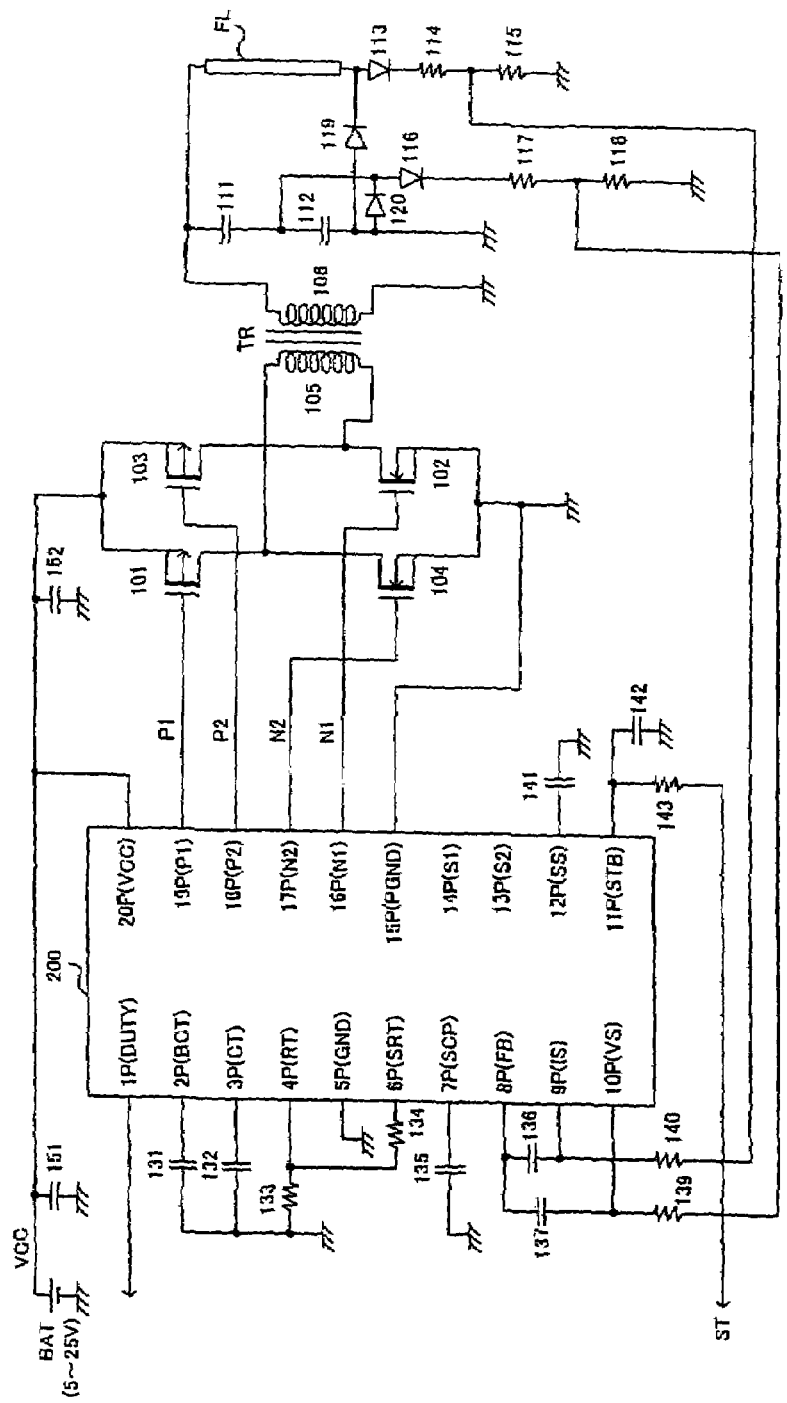
FIG. 1 is a schematic diagram showing an overall arrangement of an inverter in accordance with the invention.
Figure 2:
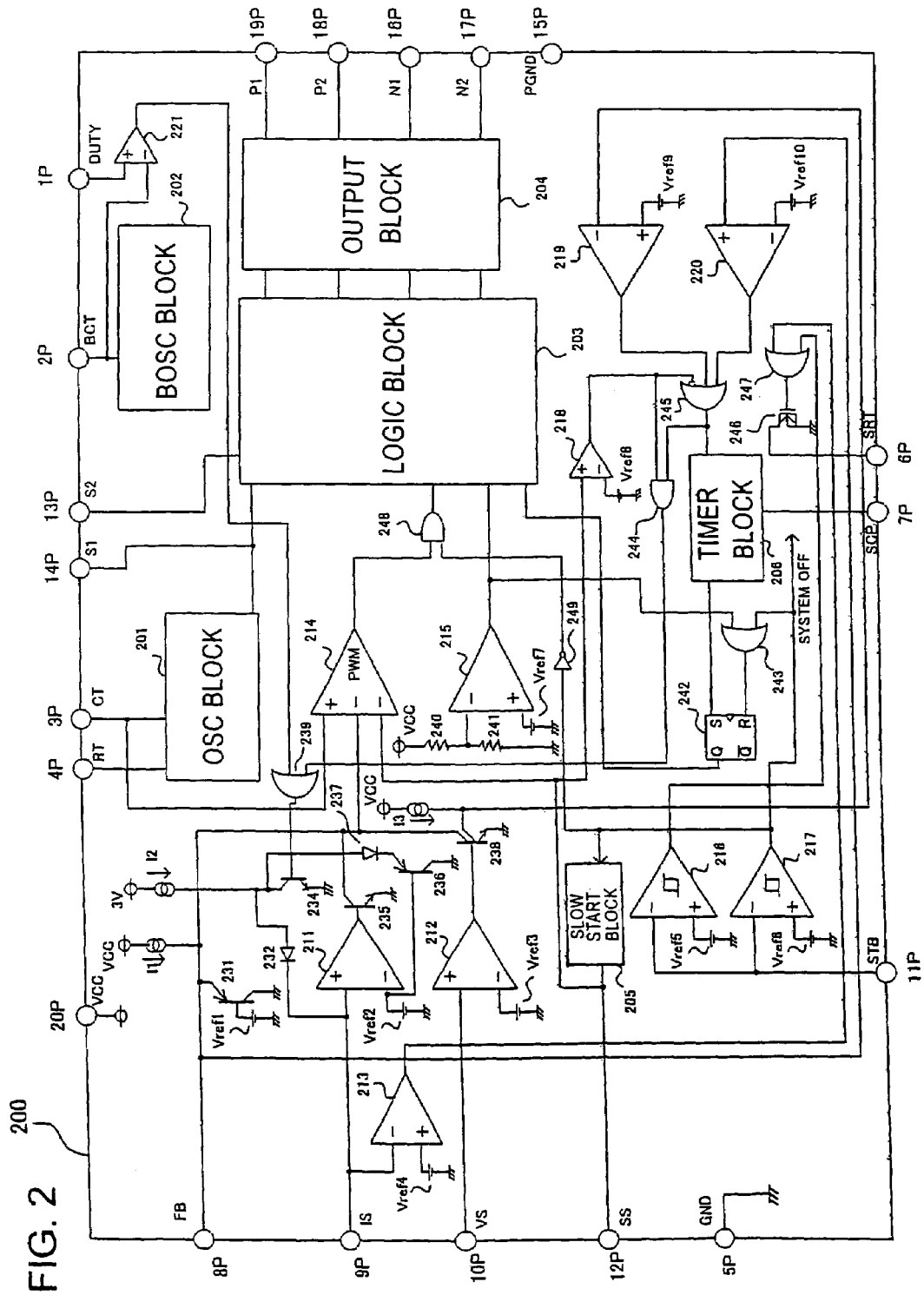
FIG. 2 is a schematic diagram showing an internal structure of a controller IC for use in the inverter of FIG. 1.

Referring to FIG. 1, there is shown an overall arrangement of an inverter according to the invention that utilizes an insulated transformer and a full bridge switch circuit for carrying out PWM. FIG. 2 illustrates the internal structure of a controller IC for use in the inverter of FIG. 1.

As shown in FIG. 1, a first switch in the form of a P-type MOSFET (hereinafter referred to as PMOS) 101 and a second switch in the form of an N-type MOSFET (hereinafter referred to as NMOS) 102 constitute a first current path in a first direction from a dc power supply to the primary winding 105 of a transformer TR. A third switch in the form of a PMOS 103 and a fourth switch in the form of NMOS 104 constitute a second current path in a second direction from the dc power supply to the primary winding 105 of the transformer TR. Each of these PMOSs 101 and 103 and NMOSs 102 and 104 have a body diode (or back gate diode). With these body diodes, current can be passed in the second direction opposite to the first. Additional diodes may be provided to fulfill the same function as the body diodes.

The primary winding 105 of the transformer TR is supplied with a power supply voltage VCC from a dc power supply BAT through PMOSs 101 and 103 and NMOSs 102 and 104 to induce a high voltage across a secondary winding 106 of the transformer TR in accordance with the winding ratio of the primary to the secondary winding. The induced high voltage is supplied to a cold cathode fluorescent light FL to turn it on.

Capacitors 111–112 and resistors 117–118 are provided to detect the voltage impressed on the cold cathode fluorescent light FL and feed the detected voltage back to a controller IC 200. Resistors 114–115 are provided to detect the current that flows through the cold cathode fluorescent light FL and feed it back to the controller IC 200. The capacitor 111 is adapted to resonate with the inductive transformer TR. The capacitance of the cold cathode fluorescent light FL also contributes to the resonance. Elements numbered 113,116, 119, and 120 are diodes. Elements numbered 151 and 152 are capacitors provided to stabilize the power supply voltage.

The controller IC 200 has a multiplicity of input-output (I/O) pins. A first pin 1P is a mode switching terminal for switching operational mode between PWM mode and intermittent operation mode (hereinafter referred to as burst mode). The first pin 1P is supplied with a duty signal DUTY for switching the operation mode and for determining the duty cycle ratio during the burst mode. A second pin 2P is a terminal (capacitive connection terminal) for connection with the capacitor 131 of a burst mode oscillator (BOSC). The second pin 2P is connected to the capacitor 131 to generate across the capacitor a triangular wave signal (i.e. triangular wave signal train) BCT for initiating a burst. The triangular wave signal will hereinafter be referred to as burst triangular wave signal.

A third pin 3P is a terminal for connection with a capacitor 132 to establish an oscillation frequency of a PWM mode oscillator (OSC). A triangular wave signal (i.e. triangular wave signal train) CT for PWM (referred to as PWM triangular wave signal) is generated at the third pin 3P connected to the capacitor 132. A fourth pin 4P is a terminal for connection with a resistor 133 for setting up a charge current to the third pin 3P. The fourth pin 4P has a potential RT, which causes a current to flow through the resistor 133 connected thereto in accord with the potential RT and the resistance of the resistor 133. A fifth pin 5P is an earth terminal having ground potential GND.

A sixth pin 6P is a terminal (referred to as resistance setting terminal) for connection with a resistor (referred to as charging current setting resistor) 134 to set up a charging current passed to the third pin 3P. The charge current setting resistor 134 connected to the sixth pin 6P is connected in parallel with the resistor 133 or disconnected therefrom, under the control of an internal circuit of the controller IC 200. The sixth pin 6P has a potential SRT, which equals either the ground potential GND or the potential RT of the fourth pin 4P. A seventh pin 7P is a terminal for connection with a capacitor 135 for setting a timer latch. The capacitor 135 when connected to the seventh pin 7P stores a charge, developing a voltage SCP in accord with the charge. The capacitor 135 determines the time limit of protective action to protect the internal circuit of the controller IC 200.

A ninth pin 9P is an input terminal of a first error amplifier. The ninth pin 9P is fed, via a resistor 140, with a current detection signal (referred to as detection current) IS in accord with the current flowing through the cold cathode fluorescent light FL. The detection current IS is inputted into the first error amplifier. An eighth pin 8P is-an output terminal of the first error amplifier. Connected between the eighth pin 8P and the ninth pin 9P is a capacitor 136. The potential of the eighth pin 8P serves as feedback control voltage FB for the PWM control. In what follows the ground potential is taken as a reference for voltages unless otherwise stated.

A tenth pin 10P is an input terminal of a second error amplifier. The tenth pin 10P is fed, via a resistor 139, with a voltage detection signal (hereinafter referred to as detection voltage) VS in accord with the voltage impressed on the cold cathode fluorescent light FL. The detection voltage VS is inputted into the second error amplifier. Connected between the tenth pin 10P and the eighth pin 8P is a capacitor 137.

An eleventh pin 11P is a terminal for setting starting time and for starting up the inverter. A signal STB is derived from a delayed startup signal ST by removing the noise therefrom by means of a resistor 143 and a capacitor 142, and is supplied to an eleventh pin 11P. A twelfth pin 12P is a terminal for connection with a grounded capacitor 141 for setting slow-start time. A slow-start voltage SS gradually develops across the capacitor 141 during a startup.

A thirteenth pin 13P is a synchronization terminal to be connected to another controller IC when the controller 200 is to be synchronized therewith. A fourteenth pin 14P is an I/O terminal of the internal clock, for connection with another controller IC when the controller 200 is to collaborate with said another controller.

A fifteenth pin 15P is an earth terminal for an external FET drive circuit. A sixteenth pin 16P is a terminal for outputting a gate drive signal N1 of the NMOS 102. A seventeenth pin 17P is a terminal for outputting a gate drive signal N2 of the NMOS 104. An eighteenth pin 18P is a terminal for outputting a gate drive signal P2 of the PMOS 103. A nineteenth pin 19P is a terminal for outputting a gate drive signal P1 of the PMOS 101. A twentieth pin 20P is a power supply terminal for receiving the power supply voltage VCC.

As shown in FIG. 2 illustrating the internal structure of the controller IC 200, an oscillation (OSC) block 201 generates a PWM triangular wave signal CT having a period of cycle determined by the capacitor 132 connected to the third pin 3P and the resistors 133–134 connected to the fourth pin 4P, and supplies the signal CT to a PWM comparator 214, The OSC block 201 also generates an internal clock and supplies it to a logic block 203.

A BOSC block 202 is an oscillation circuit (hereinafter referred to as burst triangular wave signal generation circuit) for generating a burst triangular wave signal BCT having a frequency determined by the capacitor 131 connected to the second pin 2P. The frequency of the burst triangular wave signal BCT is set much lower than the frequency of the PWM triangular wave signal CT (i.e. BCT frequency<CT frequency). The dc voltage supplied to the first pin 1P (that is, analog duty signal DUTY) is compared with the burst triangular wave signal BCT in a comparator 221. The output of the comparator 221 is used to drive an NPN transistor (hereinafter referred to as NPN) 234 via an OR circuit 239. In a case where a digital (PWM) duty signal DUTY is supplied to the first pin 1P, a resistor is connected to the second pin 2P to output a predetermined burst voltage from the BOSC block 202.

The logic block 203 is supplied with a PWM control signal, for example, to generate a switch drive signal in accord with a predetermined logic. An output block 204 generates gate drive signals P1, P2, N1, and N2, in accord with the switch drive signal received from the logic block 203, and supplies them to the respective gates of the PMOSs 101 and 103 and NMOSs 102 and 104.

A slow start block 205 is started up by the output of a comparator 217 when the startup signal ST is supplied and the signal STB inputted to the comparator 217 is raised slowly by the capacitor 142 and resistor 143 above a reference voltage Vref6. The output of the comparator 217 enables the logic block 203. A circuit 249 is an inversion circuit. The output of the comparator 217 resets a flip-flop (FF) circuit 242 via an OR circuit 243. As the start block 205 is started up, the slow-start voltage SS gradually rises, which is inputted to the PWM comparator 214 as a comparison input. Thus, at the time of startup, PWM control is executed by the slow-start voltage SS.

It is noted that during a startup, the comparator 216 turns off an NMOS 246 via an OR circuit 247 when the input voltage to the comparator 216 exceeds a reference voltage Vref5. This causes the resistor 134 to be separated from the controller IC 200 and the frequency of the PWM triangular wave signal CT to be changed. The OR circuit 247 is also fed the output of a comparator 213.

A first error amplifier 211 compares the detection current IS that is proportional to the current through the cold cathode fluorescent light FL with a reference voltage Vref2 (which is, for example, 1.25 V), and generates an output in accord with the error between them to control an NPN 235 connected to a constant current source I1. The collector of the NPN 235 is connected to the eighth pin 8P. Thus, the potential of the node (i.e. the eighth pin 8P) serves as the feedback voltage FB to be inputted as a comparison input to the PWM comparator 214.

The PWM comparator 214 compares the triangular wave signal CT with the lower one of the feedback voltage FB and the slow-start voltage SS to generate and provide PWM control signals to the logic block 203 via an AND circuit 248. Under a steady state condition reached subsequent to a startup, a triangular wave signal CT is compared with the feedback voltage FB for automated control of the current flowing through the cold cathode fluorescent light FL at a preset level.

Because the capacitor 136 is connected between the eighth pin 8P and the ninth pin 9P, the feedback voltage FB increases and decreases smoothly. As a consequence, the PWM control is carried out smoothly, without an abrupt change.

A second error amplifier 212 compares the detection voltage VS that is proportional to the voltage across the cold cathode fluorescent light FL with a reference voltage Vref3 (which is 1.25 V, for example) to generate an output voltage indicative of the difference between them. This output is used to control a double collector type NPN 238 having one end connected to the constant current source I1. Since the collector of the NPN 238 is also connected to the pin 8P, the feedback voltage FB is also controlled by the detection voltage VS. As a consequence, the comparator 212 and the NPN 238 together constitute a feedback signal control circuit for controlling the feedback signal FB.

Incidentally, if the feedback voltage FB exceeds a reference voltage Vref1 (e.g. 3 V), a PNP transistor (hereinafter referred to as PNP) 231 will be turned on to limit a further excessive rise of the feedback voltage FB.

A comparator 215 compares the power supply voltage VCC with the voltage generated by dividing the power supply voltage VCC by resistors 240 and 241 and with a reference voltage Vref7 (e.g. 2.2 V), and, when the power supply voltage VCC reaches a predetermined level, inverts its output to reset the FF circuit 242 via the OR circuit 243.

A comparator 218 compares the slow-start voltage SS with a reference voltage Vref8 (e.g. 2.2 V) to turn on the NPN 234 via an AND circuit 244 and an OR circuit 239 when the voltage SS exceeds the reference voltage Vref8. The NPN 234, when turned ON, causes a diode 232 to be reversely biased by a current source I2 and hence enables the first error amplifier 211 to perform its normal operation. Thus, the NPN 234, diode 232, and the current source I2 constitute a control mode switching circuit for switching the control mode between burst control and pulse width control mode. A diode 237 and a PNP 236 are provided to suppress an excess voltage.

When the NPN 238 having the other one of the double collectors connected to a constant current source I3 is turned ON by the second error amplifier 212, its collector voltage lowers below a reference voltage Vref9 (e.g. 3 V). This causes the output voltage of a comparator 219 to be reversed. A comparator 220 compares the feedback voltage FB with a reference voltage Vref10 (e.g. 3 V), and inverts its output voltage when the feedback voltage FB exceeds the reference voltage Vref10. The outputs of the comparators 219 and 220 are inputted, along with the inverted output of the comparator 218, to a timer block 206 via an OR circuit 245. The timer allows the inverted signal to be outputted after a predetermined time later. The output of this timer block 206 is supplied to the FF 242 to set it, and the Q output of which in turn disables the logic block 203.

Figure 3:
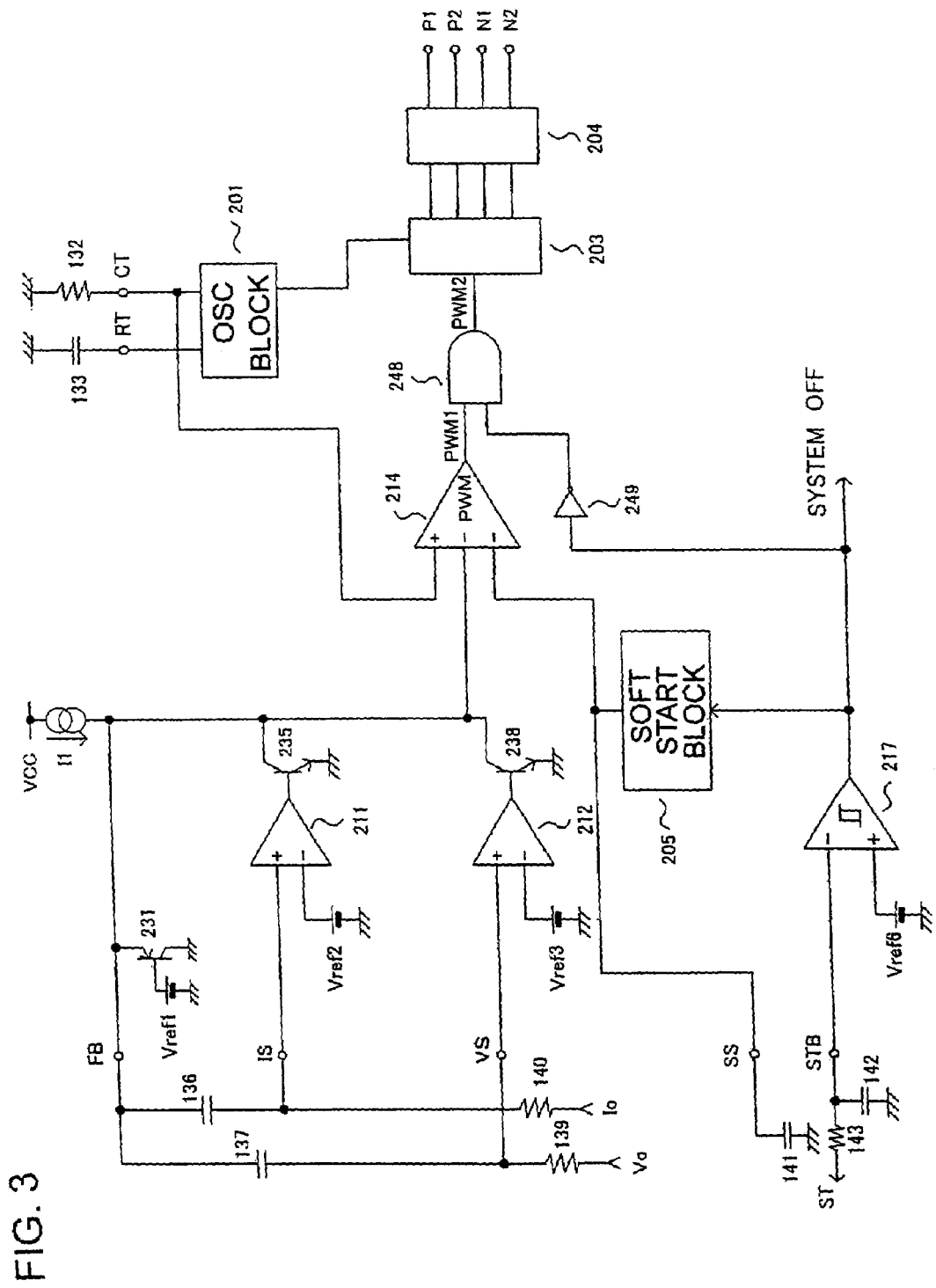
FIG. 3 is a schematic diagram of a circuit that participates in startup and stopping operation of the inverter.
Figure 4:
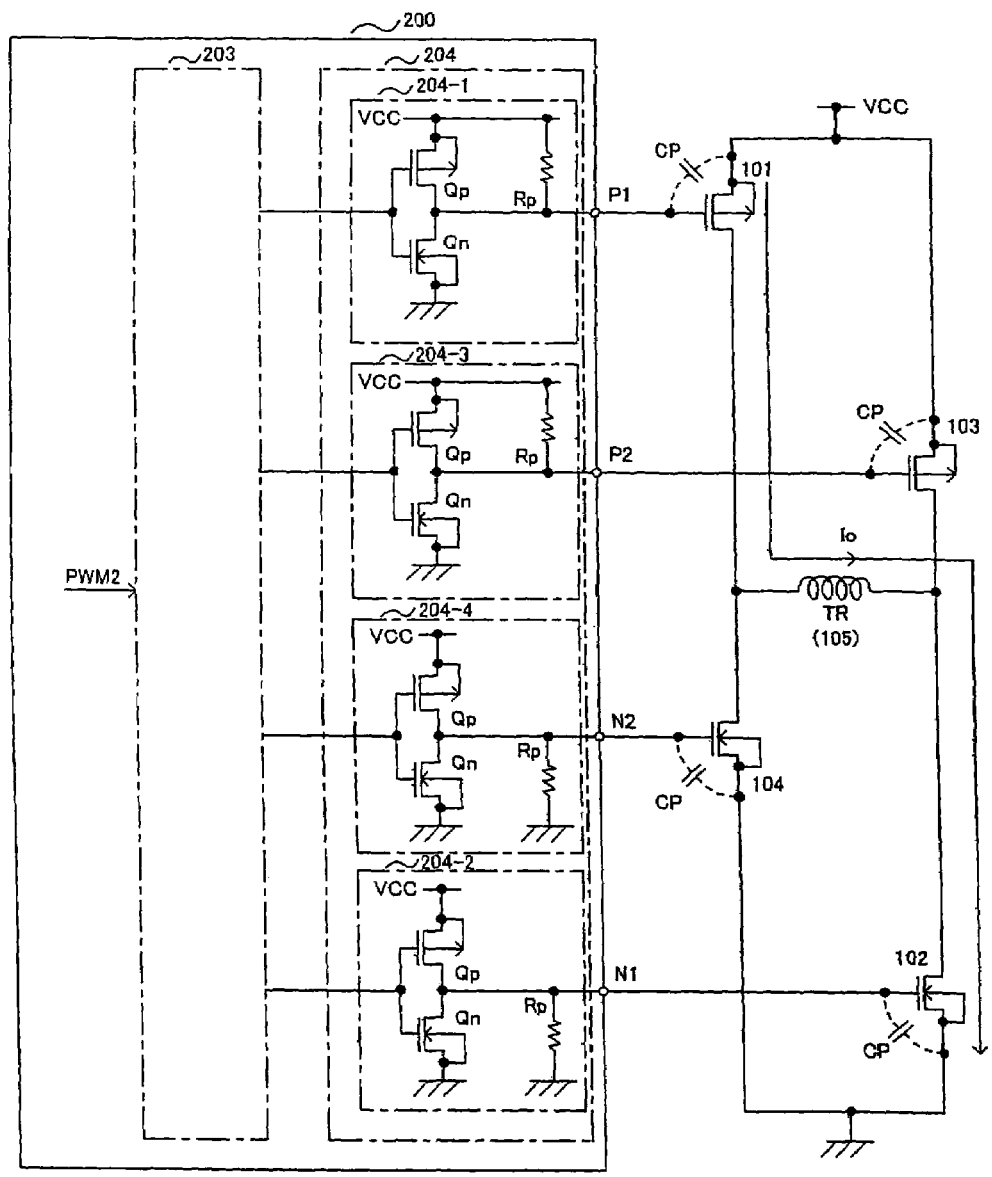
FIG. 4 is a schematic diagram showing an output block along with a semiconductor switch circuit.
Figure 5:
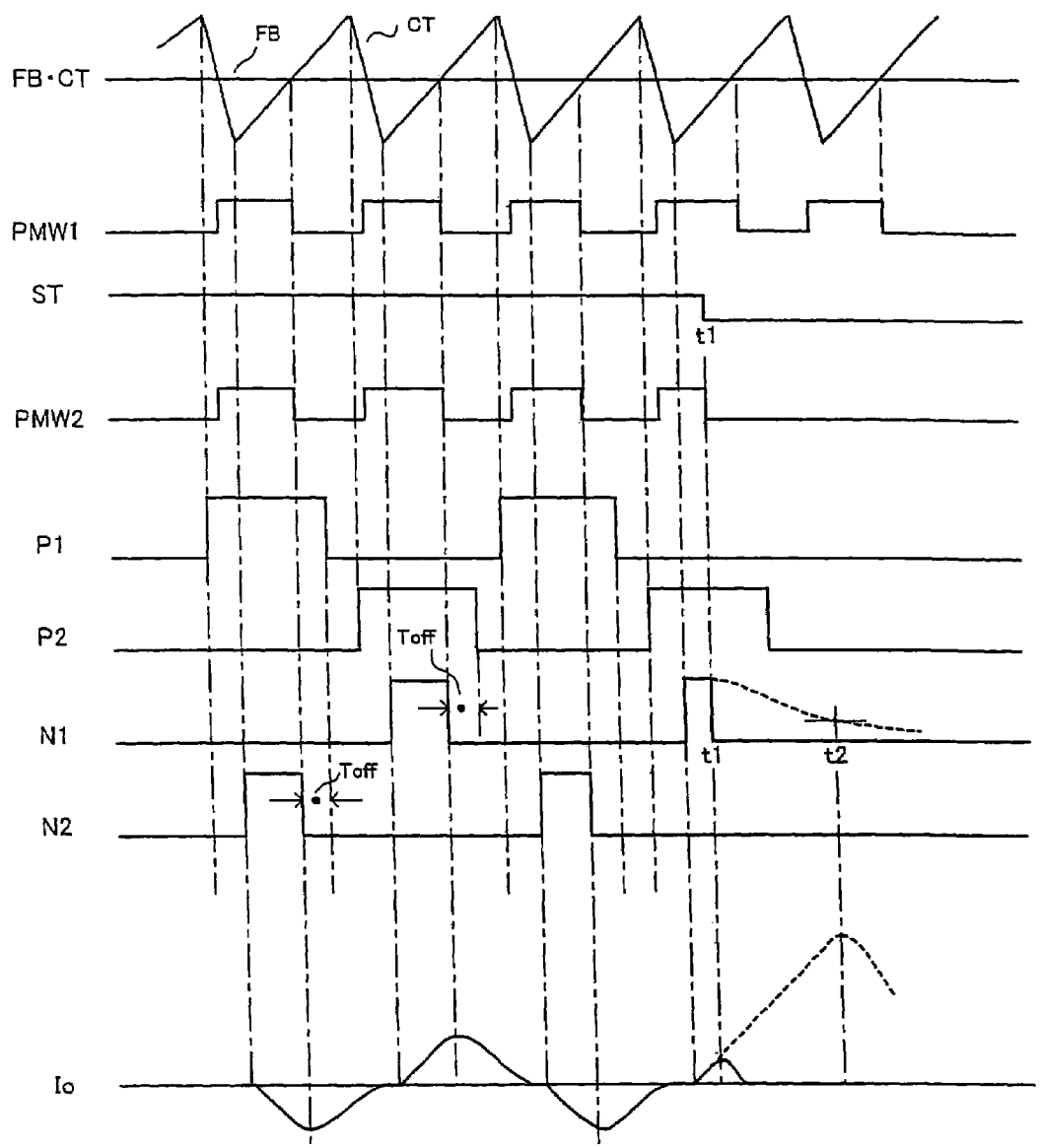
FIG. 5 is a timing diagram useful in describing the operation of the inventive inverter of FIG. 1.

Next, referring to the timing diagrams shown in FIGS. 3–5, operation of the inverter, especially during startup, normal operation, and stopping operation, will now be described. FIG. 3 shows a portion of the circuit of FIGS. 1 and 2 that takes part in the startup and stopping operations of the inverter. FIG. 4 shows an exemplary circuit structure of the output block 204, along with a semiconductor switch circuit. FIG. 5 is a timing diagram useful in describing the operations.

The output block 204 shown in FIG. 4 has drive circuits 204-1–204-4 for outputting gate drive signals P1–N2. Each of the drive circuits 204-1–204-4 has a CMOS type inverting circuit consisting of a PMOS Qp and an NMOS Qn, and a pull-up or pull-down resistor Rp. Symbols Cp represent virtual capacitances each formed between the gate and source of each of the semiconductor switches 101–104. Each of the capacitances Cp is charged in accordance with the magnitude of the associated gate drive signal P1–N2, and is discharged via an associated one of the resistors Rp.

When the controller IC 200 shown in FIG. 3 is supplied with the power supply voltage VCC, if the startup signal ST is pulled up to H level, a startup signal STB rises with a time constant determined by the resistance of the resistor 143 and the capacitance of the capacitor 142. If the startup signal STB exceeds the reference voltage Vref6, the output of the comparator 217 is pulled down from H level to L level, thereby, removing standby conditions keeping the inverter in a standby (system-off) state and supplying the power supply voltage VCC to further sections of the controller IC 200.

As the L level output of the comparator 217 is supplied to the start block 205 that includes a slow-start circuit, the constant-current source within the start block 205 is driven to supply constant current to the capacitor 141. The capacitor 141 will be charged by the constant current, causing the slow-start voltage SS to rise. That is, slow-start begins in the startup.

Thanks to a common circuit that consists of the constant current source I1 receiving the power supply voltage VCC and the NPNs 235 and 238, the feedback voltage FB to be supplied to one of the two (−)-input terminals of the PWM comparator 214 slowly rises to a high (H) level (maximum upper limit). The level of this feedback voltage FB is constrained to this constant value determined by the PNP 231 and the reference voltage Vref1.

The slowly rising slow-start voltage SS is compared with the triangular wave signal CT in the PWM comparator 214, whereby a PWM control signal PWM1 is outputted from the PWM comparator 214 in accord with the magnitude of the slow-start voltage SS. Incidentally, the PWM comparator 214 outputs a PWM control signal PWM1 of H level when the triangular wave signal CT has a level lower than the slow-start voltage SS and the feedback voltage FB. On the other hand, since the output of the inversion circuit 249 has H level, the PWM control signal PWM1 is outputted as PWM control signal PWM2 after it has passed through the AND circuit 248. Based on this PWM control signal PWM2, gate drive signals P1–N2 are formed by the logic block 203 and the output block 204, which are respectively supplied to the MOSFETs 101–104 for inverter operation.

Since the load of the inverter, i.e. cold cathode fluorescent light FL, will not be turned on until the voltage across the cold cathode fluorescent light FL reaches a predetermined level, the output voltage Vo rises with the slow-start voltage SS in an early stage of the slow start. Therefore, although the initial feedback voltage FB has the upper limit level, the inventive inverter, unlike conventional inverters, will not initially impress an excessive output voltage Vo (as high as 2000–2500 V, for example) on the cold cathode fluorescent light FL. Moreover, since there can be no inrushing current that accompanies such excessive output voltage Vo, the cold cathode fluorescent light FL and the major circuit components (e.g. MOSFETs 101–104, transformer TR, battery BAT, etc.) of the inverter are greatly relieved from stresses and damage arising from excessive voltages.

The output current Io and output voltage Vo of the inverter are detected and the detection current IS associated with the detected output current Io and the detection voltage VS indicative of the output voltage Vo are respectively inputted to the first error amplifier 211 and second error amplifier 212, where they are compared with the respective reference voltages Vref2 and Vref3 to control the NPNs 235 and 236 based on the comparison. As the NPN 235 or NPN 238 is controlled, the feedback voltage FB begins to fall from the upper limit level.

When the output voltage Vo reaches the startup voltage (about 1000 V), the output current Io begins to flow, turning on the cold cathode fluorescent light FL, which in turn causes the output voltage Vo to fall to a predetermined operating voltage (about 600 V). It is noted that no excessive inrushing current will flow either at this point. The output current Io gradually grows up, while the output voltage Vo remains at the substantially constant operating voltage. As the output voltage Vo or the output current Io grows larger, causing the NPN 235 or 238 to be controlled, the feedback voltage FB is gradually lowered from the upper limit level by the feedback action of the capacitors 136 and 137.

As the slow-start voltage SS rises, the output current Io increases and the feedback voltage FB decreases. When the feedback voltage FB becomes equal to the slow-start voltage SS, the PWM comparator 214 begins to compare the PWM triangular wave signal CT with the feedback voltage FB in place of the slow-start voltage SS that has been so far compared with the PWM triangular wave signal CT. This completes the slow start. The time required for the slow start is fairly long, since it takes time to start up the disabled cold cathode fluorescent light FL.

The output current Io is controlled to remain at a predetermined constant level determined by the reference voltage Vref2. The luminance of the cold cathode fluorescent light FL is determined by the magnitude of the current flowing through it. Hence, in order to maintain this current, a substantially constant operating voltage must be applied to the cold cathode fluorescent light FL. Thus, in order to turn on the cold cathode fluorescent light FL, the output voltage Vo is brought to a high level during a startup, but it can be lowered to a low operating voltage once the fluorescent light FL is turned on. Hence, the level of the feedback voltage FB in the steady state that follows the slow start is determined based on the magnitude of the output current Io.

As shown in FIG. 5, since the startup signal ST has H level, the gate drive signals P1–N2 are formed based on the PWM control signal PWM1 and the internal clock given by the OSC block 201, which drive the semiconductor switch circuit. The current that flows through the primary winding 105 of the transformer TR (which is here expressed as load current Io) flows alternately in the first and second directions.

The current Io flows in the first direction when the gate drive signal P1 is L level and the gate drive signal N1 is H level. That is, the current Io in the first direction starts to flow when the gate drive signal N1 is pulled to H level, and increases while the gate drive signal N1 is H level. As the gate drive signal N1 is pulled down from H level to L level, the current Io flowing in the first direction starts to decrease, releasing the energy stored in the primary winding 105.

The current Io starts to flow in the second direction when the gate drive signal N2 is pulled up to H level and increases while the gate drive signal N2 remains H level. As the gate drive signal N2 is pulled down from H level to L level, the current Io flowing in the second direction starts to decrease, releasing the energy stored in the primary winding 105. In this way, a current Io having a magnitude determined by the PWM control signal PWM1 flows through the primary winding 105 in the opposite directions alternately, effecting the inverter operation. Toff is a period provided to prevent penetration current.

Each of the switches 101–104 of this semiconductor switch circuit is switched on and off as shown in FIG. 5. The NMOS 102 turns on at every other apex of the triangular wave signal CT on one side thereof with respect to the average of the triangular wave signal CT and remains so until the immediately subsequent triangular wave signal CT and the feedback signal FB become equal in magnitude. The PMOS 101 is turned on a first predetermined time before the NMOS 102 is turned on and remains so until the triangular wave signal CT reaches the apex on the other side immediately after the NMOS 102 turns off. The NMOS 104 turns on at every other apex of the triangular wave signal CT, the apex being different from said every other apex associated with the NMOS 102, and remains so until the immediately subsequent triangular wave signal CT and the feedback signal FB become equal in magnitude. The PMOS 103 turns on a second predetermined time before the NMOS 104 turns on, under the condition that the NMOS 102 is turned off and the PMOS 101 is turned on. The PMOS 103 remains turned on until the triangular wave signal CT reaches its apex on the other side thereof immediately after the NMOS 104 turns off. The first and second predetermined times are respectively set to lengths such that either one of the PMOSs 101 and 103 is switched on.

To put the inverter operating into a standby state, the startup signal ST is pulled down from H level to L level. Since this change in level of the startup signal ST is made at an arbitrary point of time, the pulling is not synchronized with PWM control.

In the standby mode, electricity to the controller IC 200 except for portions thereof that must be kept energized in standby state is cut off. Power is then still supplied to the PMOSs 101 and 103 and NMOSs 102 and 104.

Let us now suppose that the gate drive signal N1 is at H level and the current Io is flowing in the first direction at time t1, when the startup signal ST is pulled down to L level. It takes some time before the output of the comparator 217 is inverted following the change in the startup signal ST. However, this does not matter, since the startup of the comparator 217 is initiated by the inversion.

As the startup signal ST is lowered to L level, a system-off signal SYSTEM OFF will be generated. Because of the system-off signal SYSTEM OFF, electricity is cut off to the controller IC 200 except for the portions thereof (e.g. comparator 217) that must be energized during the standby mode. However, it takes some time (system-off time) on the order of from several dozen microseconds to several hundred microseconds after t1, before the voltages supplied to various components (for example, PWM comparator 214, logic block 203, and output block 204) diminish to stop these components.

In this invention, the AND circuit 248 is closed at time t1 when the startup signal ST is lowered to L level, so that the output PWM2 of the AND circuit 248 is then promptly pulled down from H level to L level. This causes the level of the signal supplied from the logic block 203 to the inversion circuit of the drive circuit 204-2 is inverted from L level to H level, and causes PMOS Qp (which has been turned on) to be turned off and NMOS Qn (which has been turned off) to be turned on.

As a result, the charge stored in the capacitance Cp of the NMOS 102 is discharged through NMOS Qn without passing through the resistor Rp. The time required for the discharge (referred to as discharge time) is extremely short, which is, for example, about 500 ns. Consequently, the current Io that has been increasing in the first direction up to t1 starts decreasing at the moment when the NMOS 102 turns off at t1.

After the system-off time has passed, both the PMOS Qp and NMOS Qn of the drive circuit 204-2 turn off. Since this system-off time (ranging from several 10 to several 100 micro-seconds) is extremely short as compared to the discharge time (i.e. time for a capacitor to discharge entirely) of the capacitance Cp through the NMOS Qn (for example, about 500 ns), it can be said that the NMOS 102 is turned off instantly at t1.

Thus, in the invention, load current Io will never increase in a transition to a standby state.

In a conventional inverter, electricity is also cut off to the portions other than those that must be powered during a standby mode. However, in the conventional inverter, unlike the inventive inverter, PWM control signal PWM is not controlled by a startup signal ST.

Referring to FIGS. 4 and 5, one may see behaviors of drive circuit 204-2 and NMOS 102 of the conventional inverter making a transition to a standby state. As a result of cut off of power, the level of the power supply voltage VCC of the drive circuit 204-2 gradually falls. However, PWM control signal PWM1 is not controlled by the startup signal ST. As a consequence, the PMOS Qp of the drive circuit 204-2 remains turned on for a while, and then turned off subsequently. The NMOS Qn of the drive circuit 204-2 remains turned off all the time.

In this case, since the charge of the capacitances Cp only discharges through a resistor Rp, the gate drive signal N1 decreases slowly according to the time constant Cp*Rp, as shown in FIG. 5 by a dashed line. The NMOS 102 will turn off only if the gate drive signal N1 enabling the NMOS 102 lowers below the threshold value voltage at t2. The same is true also in other drive circuits.

In the conventional inverter, therefore, the load current Io continues to increase even after t1, until the NMOS 102 turns off at t2 as shown in FIG. 5 by the dashed line. The load current Io gradually decreases after t2. The magnitude of the load current Io then reaches a magnitude which is a few times (4 times in the example shown herein) the ordinary load current, though the load current is a single pulse.

As described above, in the present invention, a system-off signal SYSTEM OFF is generated in response to a startup signal ST when the inverter is put into a standby state, whereby the SYSTEM OFF signal stops the electric power to those components that need not be powered in the standby state, and at the same time the switch drive signals outputted from the switch driving circuit of the output block 204 are turned off. This permits elimination of over-current encountered in a conventional inverter making a transition to a standby state.

It should be appreciated that such over-current elimination capability can be achieved by a simple protective circuit adapted to perform AND operation on the PWM control signal PWM1 and startup signal ST.

Such protective circuit may be implemented by a circuit that causes at least one of the switch drive signals P1–N2 keeping the switches of the semiconductor switch circuit turned on, to be changed so as to turn off that switch when the startup signal ST assumes a stop-state. Thus, instead of providing the AND circuit 248 and inversion circuit 249, the startup signal ST may be directly inputted to the logic block 203 or the output block 204 to achieve the same result.

INDUSTRIAL APPLICABILITY

As described above, the inventive dc-ac converter and controller IC therefor are suitable for use with a backlight source of a liquid crystal display that requires a high ac voltage to be obtained from a low dc voltage source.

The invention claimed is:

1. A dc-ac converter, comprising:
   a dc power supply;
   a transformer having a primary winding and at least one secondary winding;
   a semiconductor switch circuit for alternately flowing current from said dc power supply to said primary winding in a first and a second directions;
   a load connected to said secondary winding;
   a current detection circuit for detecting the magnitude of said current flowing through said load to generate a current detection signal;
   a triangular wave signal generation circuit for generating a triangular wave signal;
   a control signal generation circuit, receiving said triangular wave signal and said current detection signal, for generating a control signal; and
   a switch driving circuit receiving said control signal and a run-stop signal, said switch driving circuit adapted to provide said semiconductor switch circuit with switch drive signals in accord with said control signal when said run-stop signal has a logical run-state, but, when said run-stop signal has a logical stop-state (instructing standby), provide said semiconductor switch circuit with switch drive signals instructing not to flow current to said primary winding, wherein when said run-stop signal gains the stop-state;
   the power from said power supply to said control signal generating circuit and switch driving circuit is cut off; and
   said switch driving circuit controls at least one of the switch drive signals enabling the switches of said semiconductor switch circuit so as to turn off said at least one switch.

2. The dc-ac converter according to claim 1, wherein the switches of said semiconductor switch circuit are MOSFETs.

3. The dc-ac converter according to claim 2, wherein said switch driving circuit has a logic circuit receiving said control signal and run-stop signal, said switch driving circuit adapted to form said switch drive signal based on the output of said logic circuit.

4. The dc-ac converter according to claim 2, wherein said switch driving circuit has:
   a logic circuit receiving said control signal and said run-stop signal;
   a logic block for generating switch drive signals in accordance with a predetermined logic based on said control signal that has passed said logic circuit and a clock synchronized with said triangular wave signal; and
   an output block outputting gate drive signals by amplifying said switch drive signals.

5. The dc-ac converter according to claim 4, wherein said output block is adapted to amplify and invert said inputted switch drive signals before outputting said signals as gate drive signals;
   provided at the output end thereof with a pulling resistor for pulling the level of said gate drive signals to predetermined potential; and
   adapted to render said pulling resistor short-circuited when said run-stop signal gains the stop-state.

6. The dc-ac converter according to claim 1, wherein said load is a cold cathode fluorescent light.

7. A controller IC for controlling ac power supplied to a load by driving a semiconductor switch circuit, said controller IC comprising:
   a triangular wave signal generation block, connected to an external capacitor and a resistor for establishing oscillation, for generating a triangular wave signal;
   a control signal generation circuit, receiving said triangular wave signal and a current detection signal indicative of the magnitude of detected current flowing through said load, for generating a control signal by comparing said triangular wave signal with an error signal that is formed based on said current detection signal; and
   a switch driving circuit receiving said control signal and a run-stop signal, said switch driving circuit adapted to provide said semiconductor switch circuit with switch drive signals in accord with said control signal when said run-stop signal has a logical run-state but, when said run-stop signal has a logical stop-state (instructing standby), provide said semiconductor switch circuit with switch drive signals instructing not to flow current to said primary winding, wherein, when said run-stop signal gains the stop-state,
   the power from said power supply to said control signal generating circuit and switch driving circuit is cut off; and
   said switch driving circuit controls at least one of the switch drive signals enabling the switches of said semiconductor switch circuit so as to turn off said at least one switch.

8. The controller IC according to claim 7, wherein said switch driving circuit has a logic circuit receiving said control signal and run-stop signal, said switch driving circuit adapted to form said switch drive signal based on the output of said logic circuit.

9. The controller IC according to claim 7, wherein said switch driving circuit has:
   a logic circuit receiving said control signal and run-stop signal;
   a logic block for generating switch drive signals in accordance with a predetermined logic based on said control signal that has passed said logic circuit and a clock synchronized with said triangular wave signal; and
   an output block for outputting gate drive signals by amplifying said switch drive signals.

10. The controller IC according to claim 9, wherein said output block is:
   adapted to amplify and invert said inputted switch drive signals before outputting said signals as gate drive signals;
   provided at the output end thereof with a pulling resistor for pulling the level of said gate potential to a predetermined potential; and
   adapted to render said pulling resistor short-circuited when said run-stop signal gains the stop-state.

* * * * *